United States Statutory Invention Registration [19]

[11] Reg. Number: H940

Roller

[43] Published: Aug. 6, 1991

[54] POSITIONING APPARATUS FOR STRAND IGNITER SYSTEMS

[75] Inventor: Carl H. Roller, Succasunna, N.J.

[73] Assignee: The United States of America as represented by the Secretary of the Army, Washington, D.C.

[21] Appl. No.: 417,613

[22] Filed: Oct. 5, 1989

[51] Int. Cl.[5] ..... F42B 5/02

[52] U.S. Cl. ..... 102/430; 102/470

*Primary Examiner*—Harold J. Tudor

*Attorney, Agent, or Firm*—Anthony T. Lane; Edward Goldberg; Edward F. Costigan

[57] ABSTRACT

Apparatus is disclosed for positioning and protecting a plurality of flexible burn cords in an ammunition shell. The burn cords ignite propellant in the ammunition. The positioning apparatus includes a closing plug which is secured to the base of the ammunition shell, a cover plate which extends over a cavity in the closing plug, and a plurality of legs which secure the cover plate in place. The burn cords extend into the closing plug cavity through openings in the plug, and are ignited by a separate combustion initiator which is also secured in the shell base. This positioning apparatus allows for safeguarding of the ammunition shell against inadvertent ignition by removal of the combustion initiator.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

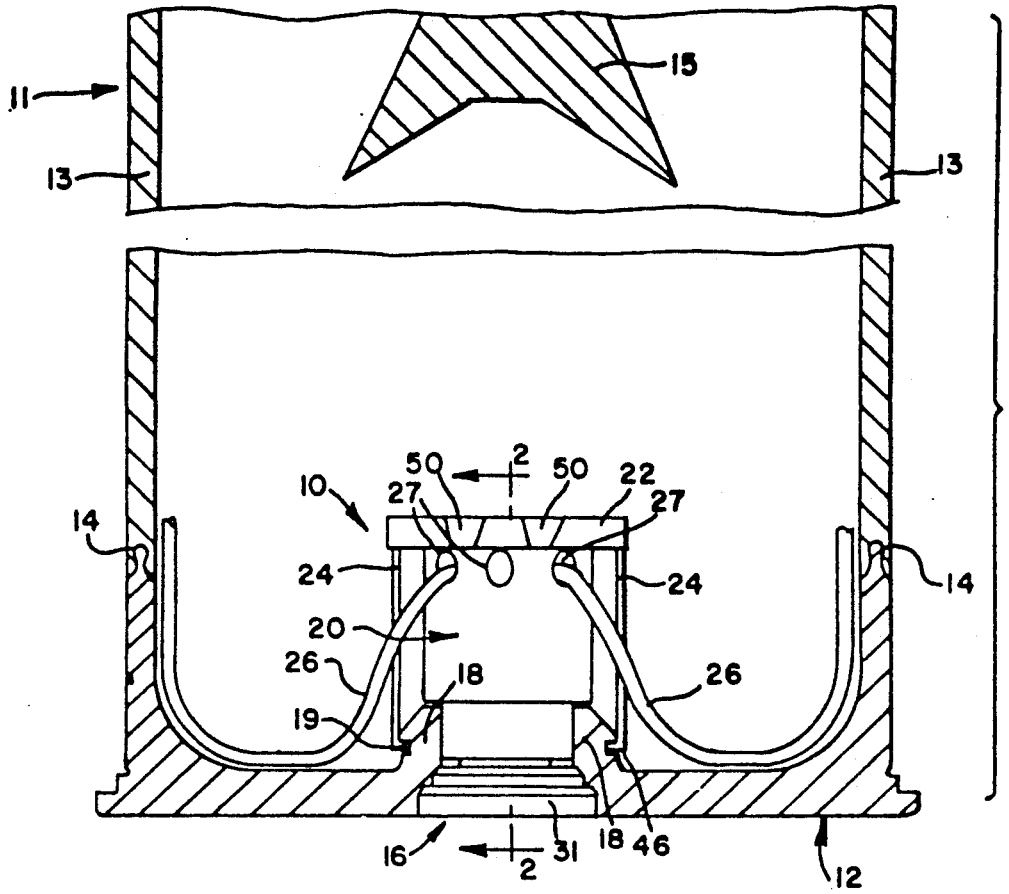
FIG. 1
FIG. 2
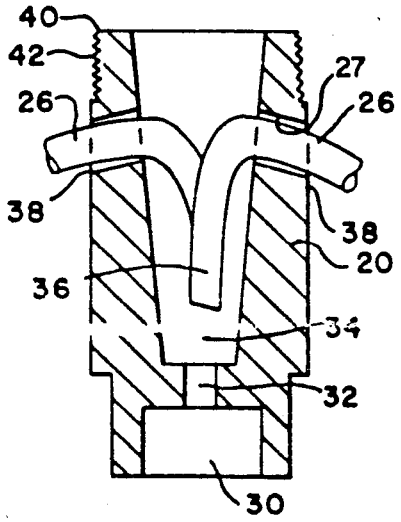
FIG. 6
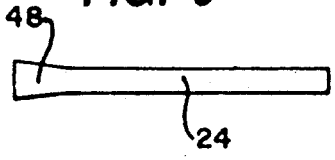
FIG. 7
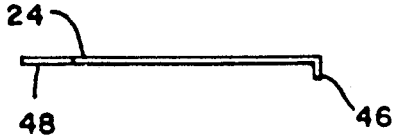

POSITIONING APPARATUS FOR STRAND IGNITER SYSTEMS

GOVERNMENTAL INTEREST

The invention described herein may be manufactured, used and licensed by or for the Government for Governmental purposes without payment to me of any royalties.

This invention relates to ignition apparatus for ammunition, and more particularly, to positioning apparatus or strand igniter systems used in ammunition propulsion systems.

BACKGROUND OF THE INVENTION

Some ammunition, such as tank ammunition, for example, is propelled by a granular propellant which is ignited by an electrically initiated center core bayonet primer. The primer extends into the cartridge case from the base towards the projectile. However, new projectile designs protrude a significant distance into the propellant bed, limiting the length of the bayonet primer.

As bayonet primers decrease in length, the volume of propellant directly ignited by the primer decreases, thus limiting the primer's effectiveness. The effectiveness of a primer is measured in terms of both concise delay times and the absence of pressure waves in the propellant bed during combustion of the propellant. Shorter bayonet primers tend to increase delay times and pressure waves during combustion, both of which are undesirable because they can adversely affect performance.

Some projectile designs extend so far into the propellant bed that a center core bayonet design is unfeasible. A suitable substitute for the bayonet is a plurality of flexible, high burn rate transfer cords, also called burn cords. The cords can be arranged either along the wall of the cartridge case, or along the boom of the projectile, with one end connected to an electric initiator in the base. However, because the strands are flexible, they must be positioned properly in the case to be protected from the shifting forces of the propellant. Thus, there is a need for apparatus for securing a plurality of flexible burn cords in selected positions in an ammunition shell, and protecting the cords from shifting forces of the propellant in the shell.

For safety and other reasons, it is desirable to disarm ammunition for storage, shipment, and disposal without substantially disassembling it. Thus, there is also a need for transfer cord positioning and securing apparatus which allows simple removal and replacement of the electric or other combustion initiator in the base after the burn cord positioning apparatus has been loaded into a cartridge and the shell has been assembled, without further disassembly of the shell.

Accordingly, one object of this invention is to provide new and improved ignition apparatus for ammunition.

Another object is to provide new and improved positioning apparatus for strand igniter systems used in ammunition propulsion systems.

Still another object is to provide new and improved apparatus for securing a plurality of flexible burn cords in selected positions in an ammunition shell.

Yet another object is to provide new and improved apparatus for protecting flexible burn cords from the shifting forces of the propellant in am ammunition shell.

A still further object is to provide new and improved ignition apparatus for ammunition which allows removal and replacement of the combustion initiator after the ignition apparatus has been loaded into an ammunition case and the ammunition cartridge has been assembled, without further disassembly of the shell.

SUMMARY OF THE INVENTION

In keeping with on aspect of this invention, apparatus for positioning a plurality of flexible burn cords in an ammunition shell includes a closing plug secured inside the base of the shell. The closing plug is in an opening in the base, and the opening extends through the base, so that a combustion initiator can be removably secured in the opening adjacent one end of the closing plug, from the outside of the shell.

The closing plug has an orifice adjacent the base which permits combustion from the combustion initiator to travel into a cavity in the other end of the closing plug. The cavity in the closing plug is covered by a cover plate, and the cover plate is secured in place by a plurality of legs which extend from the cover plate to the base of the shell.

The closing plug also includes a plurality of openings in the cavity through which burn cords may be placed for ignition when combustion from the initiator travels into the cavity. The burn cords are secured in the shell to ignite the propellant in the ammunition.

BRIEF DESCRIPTION OF THE DRAWINGS

The above-mentioned and other features of the invention and the manner of obtaining them will become more apparent, and the manner of obtaining them better understood with reference to the following description of an embodiment of the invention taken in conjunction with the accompanying drawings, in which:

FIG. 1 is an elevational view of a partially assembled embodiment of the invention installed in the base of an ammunition shell, with the base case and projectile fin shown in cross-section;

FIG. 2 is a cross-sectional view of the closing plug of the apparatus of FIG. 1, taken along lines 2—2 in FIG. 1;

FIG. 6 is a plan view of a leg used to secure the cover plate to the base in the apparatus of FIG. 1; and FIG. 7 is a side view of the leg of FIG. 6.

DETAILED DESCRIPTION

Figure 3:
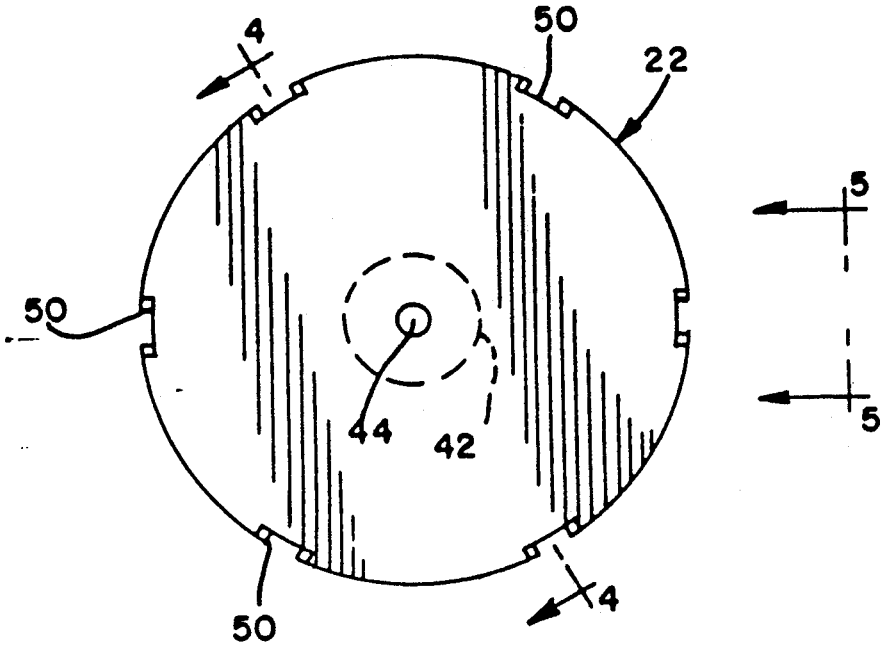
FIG. 3 is a top plan view of the cover plate of the apparatus of FIG. 1.

As seen in FIG. 1, burn cord positioning apparatus (10) is secured to a base (12) of an ammunition shell (11). The base (12) has a central opening (16) and a lip (18) which surrounds the opening (16) on the inside of the base (12). An annular groove (19) surrounds the lip (18).

The apparatus (10) includes a cylindrical closing plug (20), a cover plate (22), and a plurality of legs (24). A plurality of burn cords (26) are installed in the closing plug of the apparatus (10) by press fitting them in openings (27), or securing them with adhesive or by another. suitable method. The cords are also secured to the base (12), the shell casing (13), or the projectile (15) using adhesives, tape, or other suitable structure.

The plug (20) (FIG. 2) includes an opening (30) for a combustion initiator (31) (FIG. 1), a smaller orifice (32) (FIG. 2) through which a spark or other combustion products may pass, and a cavity (34) which holds the ends (36) of the burn cords (26). The burn cords (26) enter the cavity (34) through openings (27). One opening (27) in FIG. 1 is shown without a burn cord (26), for clarity. In any event, it is contemplated that a single burn cord (26) passes through each opening (27).

Figure 4:
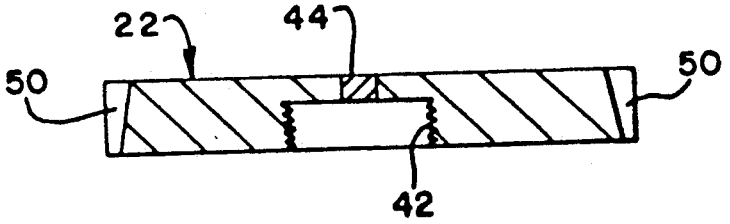
FIG 4 is a cross-sectional view of the cover plate of FIG. 3, taken along lines 4—4 in FIG. 3.

The cover plate (22) is secured to the top (40) of the closing plug (20) by threads (42), as seen in FIGS. 2 and 4. A vent hole (44) is provided in the plate (22) to release pressure inside the cavity (34) and prevent an internal explosion in the closing plug (20). The plate (22) may extend horizontally beyond the edge of the top (40), as seen in FIG. 1.

Figure 5:
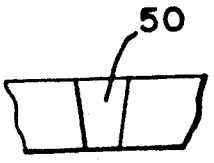
FIG. 5 is a detail view of the leg attachment portion of the cover plate of FIG. 3, taken along lines 5—5 in FIG. 3.

The legs (24) further secure the cover plate (22). The plate (22) may include six legs (24) equally spaced around its periphery, as shown in FIG 5, or any other suitable number of legs. The legs (24) include a bent end (46) (FIG. 7) which fits in the annular groove (19) in the base (12). The opposite ends (48) of the legs (24) are expanded, as seen in FIG. 6, and fit into corresponding slots (50) in the cover plate (22), shown in FIGS. 3, 4 and 5. A pair of slots (50) are shown in FIG. 1 with the legs removed for better understanding.

The combustion initiator (31) may be secured in the base opening (16) by threads or any other suitable structure. The initiator (31) can be easily installed and removed, without removing the closing plug (20) or otherwise disassembling the shell.

While the apparatus (10) could have application in many sizes and forms of ammunition, it has particular application in tank ammunition. Such ammunition is generally about 7 inches in diameter and about 3 feet long. The opening in the base is about 1 to 2 inches in diameter, and the positioning apparatus (10) extends about 2–3 inches into the case. Also, the number of burn cord openings (27) in the plug (20) may be any suitable desired number, but it is contemplated that two to six openings, with one burn cord in each opening, would be preferably for many applications. The apparatus can be made of any suitable material, including high strength plastic having a high melt temperature.

In use, the ammunition is assembled by securing the legs (24) to the cover plate (22) and placing the burn cords (26) in the closing plug (20). The plug (20) is threaded into the cover plate (22) and the assembled apparatus is placed in the base (12), with the legs (24) snapping into the groove (19). The burn cords are secured to the base and/or the case or projectile, as desired. The combustion initiator (31) can be installed in the opening (16) and removed easily for storage or shipment, without removing the positioning apparatus or the charge.

Alternative designs are also contemplated. For example, the legs and cover plate could be eliminated by making the closing plug with an integral top, and threading the closing plug into the case base. The initiator could be thread into the case base, if desired.

The many advantages of this invention are now apparent. A plurality of flexible burn cords are secured in selected positions in an ammunition shell. The flexible cords, and particularly the ends of the cords in the closing plug, are protected from the shifting forces of the propellant in the shell, and the combustion initiator can be easily removed and replaced after the ignition apparatus has been installed in the ammunition, without removing the positioning apparatus or the charge in the shell.

The foregoing disclosure and drawings are merely illustrative of the principles of this invention and are not to be interpreted in a limiting sense. I wish it to be understood that I do not desire to be limited to the exact details of construction shown and described because obvious modifications will occur to a person skilled in the art.

What is claimed is:

1. Apparatus for positioning and protecting a plurality of flexible burn cords in an ammunition shell, the burn cords igniting propellant in the shell, the shell having a projectile at one end of a case and a base at the other end of the case, the base having a central opening for securing a combustion initiator, comprising a closing plug secured in the opening of the base, said closing plug having an orifice for passing combustion from the combustion initiator into a cavity in said closing plug, said cavity being open at the top of said closing plug, said closing plug further having a plurality of openings for passing the ends of the burn cords into said cavity, means for securing the ends of the burn cords in said cavity, and plate means secured to the top of said closing plug for covering said top and said cavity.

2. The apparatus of claim 1 wherein said shell may be safeguarded against inadvertent ignition by removal of said combustion initiator.

3. The apparatus of claim 1 comprising a plurality of legs secured between said plate means and the base.

4. The apparatus of claim 3 wherein said shell may be safeguarded against inadvertent ignition by removal of said combustion initiator.

5. The apparatus of claim 3 wherein the base includes a lip which surrounds the central opening on the inside of the base, the lip including an annular groove on the outside of the lip, said legs comprising a bent end which is secured in the annular groove, and an extended end which fits into a corresponding slot in said plate means.

6. The apparatus of claim 5 wherein said shell may be safeguarded against inadvertent ignition by removal of said combustion initiator.

7. The apparatus of claim 1 wherein said plate means has a vent hole for releasing combustion products from said cavity.

8. A method of positioning and protecting a plurality of flexible burn cords in an ammunition shell, the shell having a projectile in one end of a case and a base at the other end of the case, the base having a central opening, comprising the steps of securing a closing plug in the central opening of the base, securing the ends of a plurality of burn cords through openings in the outside wall of said closing plug, the burn cords extending into a cavity in said closing plug, said cavity being open at the top of said closing plug, and securing a cover plate on the top of said closing plug over said cavity.

9. The method of claim 5 comprising the step of securing a plurality of legs between said plate and the base.

* * * * *